(12) United States Patent
Karsch

(10) Patent No.: US 9,987,797 B2
(45) Date of Patent: Jun. 5, 2018

(54) METHOD FOR MANUFACTURING A FUEL TANK AND FUEL TANK

(71) Applicant: Kautex Textron GmbH & Co. KG, Bonn (DE)

(72) Inventor: Ulrich Karsch, Niederkassel (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 0 days. days.

(21) Appl. No.: 14/779,266

(22) PCT Filed: Mar. 7, 2014

(86) PCT No.: PCT/EP2014/054426
§ 371 (c)(1),
(2) Date: Sep. 22, 2015

(87) PCT Pub. No.: WO2014/146911
PCT Pub. Date: Sep. 25, 2014

(65) Prior Publication Data
US 2016/0059477 A1    Mar. 3, 2016

(30) Foreign Application Priority Data
Mar. 22, 2013 (DE) .................. 10 2013 004 931

(51) Int. Cl.
*B29C 51/02* (2006.01)
*B29C 65/00* (2006.01)
(Continued)

(52) U.S. Cl.
CPC ............. *B29C 66/54* (2013.01); *B29C 51/02* (2013.01); *B29C 51/12* (2013.01); *B29C 51/145* (2013.01);
(Continued)

(58) Field of Classification Search
CPC ....................................................... B29C 66/54
See application file for complete search history.

(56) References Cited

U.S. PATENT DOCUMENTS 6,044,926 A * 4/2000 Yamane .................... F01N 1/10
181/230
6,276,201 B1 * 8/2001 Gette ................... B60K 15/077
220/4.12
(Continued)

FOREIGN PATENT DOCUMENTS

| CN | 1764558 A | 4/2006 |
|---|---|---|
| DE | 102006041837 A1 | 3/2008 |

(Continued)

OTHER PUBLICATIONS

English language PCT International Search Report and Written Opinion dated Jun. 5, 2014, received in corresponding PCT Application No. PCT/EP14/54426, 10 pgs.
(Continued)

*Primary Examiner* — Jeffry H Aftergut
*Assistant Examiner* — Jaeyun Lee
(74) *Attorney, Agent, or Firm* — Grossman, Tucker, Perreault & Pfleger, PLLC

(57) ABSTRACT

The invention relates to a method for manufacturing a fuel tank on the basis of thermoplastic material, the method comprising the following method steps:
  producing semifinished products in sheet form from a fiber composite material with a matrix of thermoplastic material,
  laminating the semifinished products with a laminate that comprises at least one barrier layer for hydrocarbons,
  heat-treating the laminated semifinished products until the thermoplastic material plasticizes,
(Continued)

Figure 1:
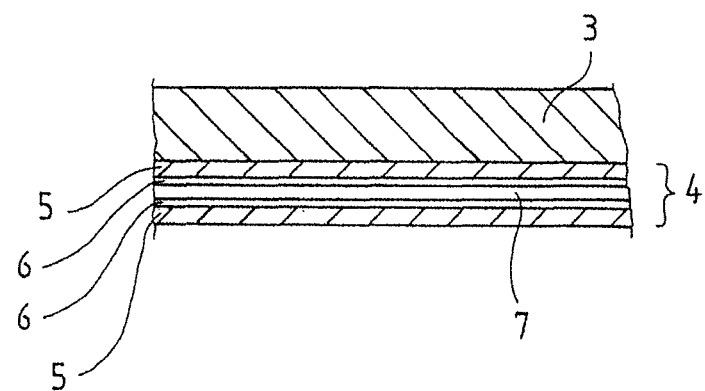

thermoforming the plasticized semifinished products in a thermoforming mold to form shells and
joining the shells to form an essentially closed tank.

17 Claims, 2 Drawing Sheets

(51) Int. Cl.

| | | |
|---|---|---|
| *B29C 65/50* | (2006.01) | |
| *B29C 65/02* | (2006.01) | |
| *B60K 15/03* | (2006.01) | |
| *B29C 51/12* | (2006.01) | |
| *B29C 51/14* | (2006.01) | |
| *B29C 65/14* | (2006.01) | |
| *B29C 65/16* | (2006.01) | |
| *B29C 65/48* | (2006.01) | |
| *B29L 31/00* | (2006.01) | |
| *B29K 23/00* | (2006.01) | |
| *B29K 105/08* | (2006.01) | |
| *B29K 105/00* | (2006.01) | |

(52) U.S. Cl.
CPC .......... *B29C 65/02* (2013.01); *B29C 65/5071* (2013.01); *B29C 66/0324* (2013.01); *B29C 66/135* (2013.01); *B29C 66/1312* (2013.01); *B29C 66/721* (2013.01); *B29C 66/7234* (2013.01); *B29C 66/7392* (2013.01); *B60K 15/03177* (2013.01); *B29C 65/1412* (2013.01); *B29C 65/16* (2013.01); *B29C 65/48* (2013.01); *B29C 66/53247* (2013.01); *B29C 66/55* (2013.01); *B29C 66/71* (2013.01); *B29C 66/7212* (2013.01); *B29C 66/72141* (2013.01); *B29K 2023/065* (2013.01); *B29K 2023/086* (2013.01); *B29K 2105/08* (2013.01); *B29K 2105/256* (2013.01); *B29K 2995/0069* (2013.01); *B29L 2031/7172* (2013.01); *B60K 2015/03032* (2013.01); *B60K 2015/03046* (2013.01); *B60K 2015/0346* (2013.01); *B60K 2015/03493* (2013.01)

(56) References Cited

U.S. PATENT DOCUMENTS

| | | | |
|---|---|---|---|
| 6,596,356 B1 * | 7/2003 | Short | B32B 27/08 220/562 |
| 2002/0024171 A1 * | 2/2002 | Rohde | B29C 47/0066 264/515 |
| 2002/0113694 A1 | 8/2002 | Muirhead | |
| 2004/0009315 A1 * | 1/2004 | Potter | B60K 15/03177 428/35.7 |
| 2004/0071904 A1 * | 4/2004 | Short | B32B 1/02 428/35.7 |
| 2009/0308881 A1 * | 12/2009 | Eulitz | B29C 51/12 220/660 |
| 2012/0222809 A1 * | 9/2012 | Scherzer | B05D 3/12 156/305 |
| 2013/0193139 A1 | 8/2013 | Karsch | |
| 2014/0326732 A1 | 11/2014 | Hutzen et al. | |

FOREIGN PATENT DOCUMENTS

| | | |
|---|---|---|
| EP | 0064310 A2 | 11/1982 |
| EP | 1955887 A2 | 8/2008 |
| EP | 2067648 A1 | 6/2009 |
| WO | 2007045466 A1 | 4/2007 |
| WO | 2010151724 A2 | 12/2010 |

OTHER PUBLICATIONS

English language PCT International Preliminary Report on Patentability dated Jun. 30, 2015, received in corresponding PCT Application No. PCT/EP14/54426, 16 pgs.

\* cited by examiner

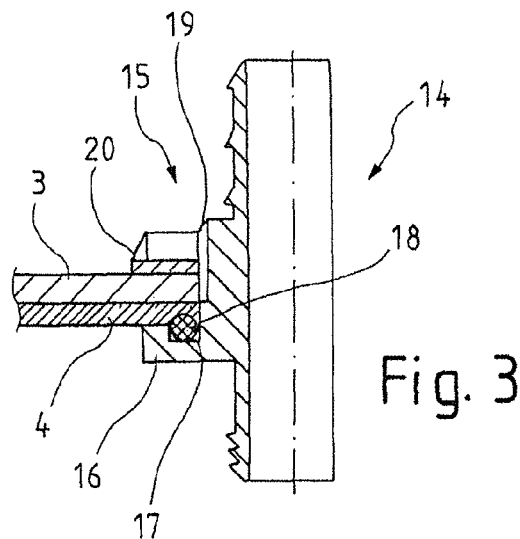
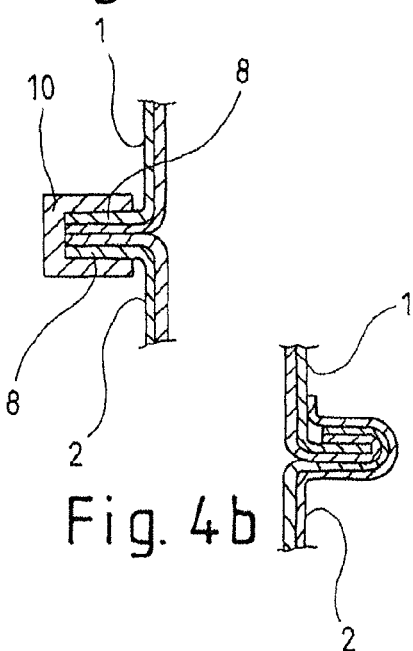
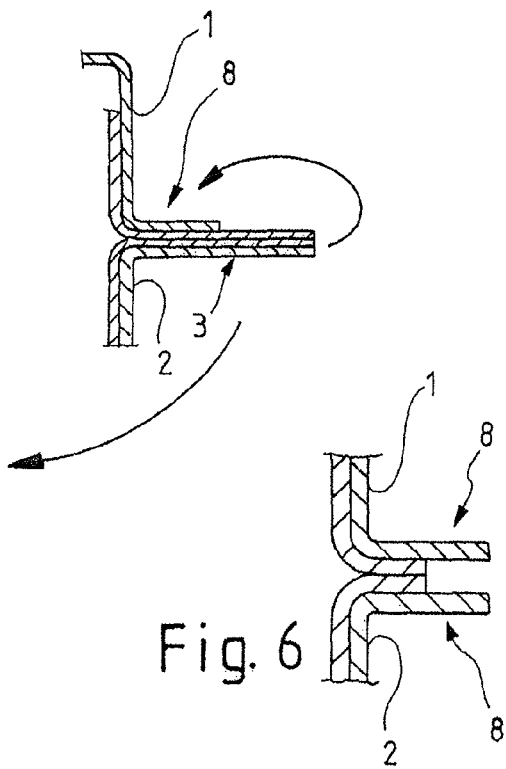

METHOD FOR MANUFACTURING A FUEL TANK AND FUEL TANK

The invention relates to a method for manufacturing a fuel tank on the basis of thermoplastic material.

Known fuel tanks of thermoplastic material are mainly formed on the basis of polyethylene (HDPE). These often have a multi-layered wall structure with barrier layers for hydrocarbons. Known fuel tanks of thermoplastic material are manufactured either by injection moulding, extrusion blow-moulding or thermoforming or by combinations of the aforementioned processes. In comparison with fuel tanks of sheet metal, fuel tanks of thermoplastic material have the advantage that they can be manufactured relatively easily with a spatially complex contour and are just as relatively deformation-resistant and stable. The plastic has a certain elasticity, so that short-term deformations of a fuel tank of thermoplastic material are non-critical, insofar as they generally do not lead to permanent changes in the contour of the tank.

Since, however, the HDPE that is usually used for the manufacture of plastic fuel tanks has a tendency to flow when it is subjected to tensile/compressive loading over prolonged periods of time, without additional reinforcing measures fuel tanks are not suitable for permanently withstanding increased internal pressure without permanent deformations of the tank contour occurring.

Therefore, various measures for the structural reinforcement/structural stiffening of fuel tanks of thermoplastic material are known. On the one hand, it is known to reinforce the tank walls locally, on the other hand it is known to provide within the fuel tanks supporting elements and tie bars, which are intended to avoid bulging or buckling of the fuel tank under variations in pressure. EP 2067648 A1 describes a a fuel tank and a method for producing such wherein two discrete parts of a tank, each having a laminate structure comprising a fluororesin layer and a thermoplastic resin layer are utilized. All of the known reinforcing measures significantly increase the mass of the fuel tank. Plastic tanks according to the present state of the art, of one or more layers, have an average wall thickness of 5 to 6 mm and, depending on the tank volume, a mass of about 6 to 10 kg. Additional requirements for stability and fire protection inevitably lead to an increase in this mass, which is actually undesirable in respect of a lightweight structure.

The invention is based on the object of providing a method of the type mentioned at the beginning with which fuel tanks which have a likewise reduced wall thickness with a significantly reduced weight can be manufactured.

The object is achieved by a method for manufacturing a fuel tank on the basis of thermoplastic material, the method comprising the following method steps:
producing semifinished products in sheet form from a fibre composite material with a matrix of thermoplastic material,
laminating the semifinished products with a laminate that comprises at least one barrier layer for hydrocarbons,
heat-treating the laminated semifinished products until the thermoplastic material plasticizes,
thermoforming the plasticized semifinished products in a thermoforming mould to form shells and
joining the shells to form an essentially closed tank.

An essential aspect of the method according to the invention concerns the provision of film-laminated semifinished products of a fibre composite material with a matrix of thermoplastic material, the thermoplastic matrix allowing these semifinished products to be formed into corresponding shells in a separate shaping process. Such semifinished products of fibre composite material are, for example, so-called organometallic sheets with a thermoplastic matrix, which can be produced in relatively small material thicknesses with increased strength.

A relatively thin film is laminated onto these relatively stiff semifinished products.

Firstly, the finished-laminated semifinished products produced by the method are cooled and cured. They may be configured in any way desired in a moulding process performed at a different time than the production of the semifinished products.

The heat treatment of the laminated semifinished products may be performed, for example, by means of a known infrared heating device on a thermoforming mould.

In the course of this heat treatment, a preconditioning of the semifinished products may be provided, i.e. preheating of the semifinished products before the final step of heating up until the thermoplastic material plasticizes.

In the case of a particularly expedient embodiment of the method according to the invention, it is provided that the semifinished products are only laminated on one side and that the laminated side forms the inner side of the fuel tank.

The shells are expediently formed in each case with a peripherally encircling flange. The shells may, for example, be bent over to create an edge-formed seam, such an edge-formed seam or lock seam forming a labyrinth seal of the tank seam. In particular if the film that is laminated-on on the inside has a relatively small thickness, bending the peripherally encircling flange over to create an edge-formed seam is advantageous.

Alternatively, the flange may be provided with a peripheral profile, which reaches around the end faces of the shells and forms a peripheral abutting edge. Such a peripheral profile may be formed, for example, as a C profile or a U profile, which is adhesively bonded or welded to the shells. The peripheral profile may also be moulded on in one piece in a downstream injection-moulding process.

Woven or laid fibre structures that are embedded in a thermoplastic matrix are preferably used as fibre composite materials. An HDPE comes into consideration, for example, as the thermoplastic matrix. The fibres may be selected from a group comprising glass fibres, carbon fibres and aramid fibres.

The method according to the invention also comprises the introduction of inserts into the tank before the joining of the shells. For the purposes of the present invention, inserts are valves, lines, surge tanks, feed units or the like.

In the case of a particularly advantageous variant of the method according to the invention, the inserts are premounted on an insert carrier. The insert carrier may be inserted into a shell as a lost carrier. For example, such an insert carrier may be formed as an injection-moulded plastic carrier that is already adapted to the tank contour. Fastening means for venting lines, valves, nipples and the like may already be moulded onto this carrier.

The inserts are preferably fastened to the insert carrier in the position in which they are later to be installed.

The insert carrier may be welded, clamped or latched.

Expediently, before the joining, at least one shell is provided with at least one lead-through for at least one line connection, into which a connection element is inserted from the inside in a sealing manner. Such a connection element may be, for example, a connection nipple for a venting line of the tank or the like. The connection element may, for example, be already provided on a venting spider (line spider with valves) premounted on the insert carrier and is inserted into the correspondingly lead-through in a sealing manner during mounting of the insert carrier, for example in an upper shell of the tank, and is fastened from the outside after joining of the tank shells.

The welding or joining of the shells to form the closed tank may be performed, for example, by means of heated elements/hot plates, lasers, infrared heating devices or the like.

The semifinished products may also be formed such that they have, encircling the periphery on the laminated side, a narrow strip that is excluded from the film lamination. This periphery may form part of the encircling flange of the shells that absorbs the joining pressure during the welding, so that the EVOH layer of the laminate is not exposed by the joining, which would lead to impairment of the welded connection, since EVOH does not enter into an adhesive bond with HDPE.

The invention also relates to a fuel tank manufactured by the previously described method, the fuel tank comprising a tank body with a self-supportingly stiff outer shell of a fibre-reinforced thermoplastic material, which on the inner side of the tank is laminated with a multi-layered film of plastic, the outer shell being thicker than the film of plastic and the film of plastic comprising at least one barrier layer for hydrocarbons.

The film of plastic may, for example, have a maximum thickness of 1.25 mm. It may be formed as a five-layered laminate with EVOH as the barrier layer.

This five-layered laminate comprises, for example, EVOH in a layer thickness of between fifty and two hundred and fifty micrometers, which is embedded in two layers of adhesion promoter of at most two hundred micrometers each. HDPE covering layers, each of a layer thickness of three hundred micrometers, may be provided, for example, as outer layers.

It is advantageous if the ratio of the thickness of the outer shell to the thickness of the film of plastic is between 2 and 1.2.

The outer shell or the base material of a thermoplastic fibre-reinforced material may, for example, have a thickness of approximately 1.5 mm, so that the finished tank has a maximum total wall thickness of 2.75 mm, and at the same time a relatively high strength.

Figure 2:
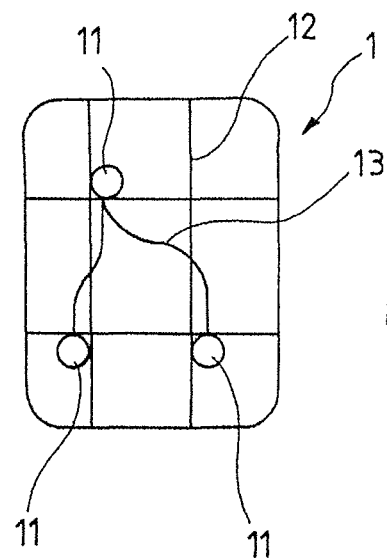

The invention is explained below on the basis of an exemplary embodiment that is represented in the drawings, in which:

FIG. 1 shows a section through a tank wall of a fuel tank manufactured by the method according to the invention, FIG. 2 shows a view from the inside of an upper shell of the fuel tank according to the invention, FIG. 3 shows a section through the tank wall of the fuel tank according to the invention in the region of a lead-through, FIG. 4a shows a section through the tank wall in the region of the encircling flange before the bending over, FIG. 4b shows a section through the bent-over edge-formed seam of the tank, FIG. 5 shows a section through the tank wall in the region of the flange that is reached around by a peripheral profile and FIG. 6 shows a section through the tank wall in the region of the flange just before the welding of the shells.

Reference is first made to FIG. 2 of the accompanying drawings.

FIG. 2 shows a view into an upper shell 1 of a fuel tank according to the invention. The fuel tank is joined together from the upper shell 1 and a lower shell 2, complementing the upper shell, to form an essentially closed hollow body. A full view of the fuel tank is not shown in the drawings.

Both the upper shell and the lower shell are provided with an encircling flange 8, at which the upper shell 1 and the lower shell 2 are joined to form the closed tank.

As already mentioned at the beginning, both the upper shell 1 and the lower shell 2 consist of a carrier material in the form of an organometallic sheet 3 and a laminate 4 laminated-on on one side, which in the present case is formed as a multi-layer film. The organometallic sheet 3 consists, for example, of a base material/matrix material of HDPE (High-Density Polyethylene) with fibres embedded in it in the form of carbon fibres, glass fibres or aramid fibres. The fibres are embedded in the matrix material in the form of a laid or woven structure. The organometallic sheet may be additionally provided on the visible side/outer side with an HDPE covering layer, which ensures that the fibre reinforcement is completely covered.

The laminate 4 that is provided on the inside of the organometallic sheet 3 comprises two HDPE covering layers 5, two layers of adhesion promoter 6 and an EVOH layer 7 as a barrier layer.

A method for manufacturing the fuel tank according to the invention envisages the provision of a completely made-up and laminated semifinished product in the form illustrated in FIG. 1. The semifinished product is first subjected to a heat treatment and then shaped into shells in a thermoforming mould.

At the same time, the shells are formed with a preferably encircling flange 8.

In the region of this flange, the shells, i.e. the upper shell 1 and the lower shell 2, are preferably joined, i.e. connected to one another with a material bond, preferably welded to one another.

The different variants of the peripheral connection of the upper shell 1 and the lower shell 2 are illustrated in FIGS. 4 to 6.

FIGS. 4a and 4b show two successive method steps of the peripheral joining of the upper shell 1 and the lower shell 2, the procedure that is shown in FIGS. 4a and 4b being favourable if the flange 8 of the upper shell 1 and the lower shell 2 are respectively of different lengths.

In a first step, the just-formed upper shell 1 and lower shell 2 are placed one on top of the other, as represented in FIG. 4a. In this state, the upper shell 1 and the lower shell 2 may be still warm and plastic, so that subsequent welding can be performed by using the basic heat of the material.

In principle, however, the upper shell 1 and the lower shell 2 may also have been placed one on top of the other in the cold state. Then, for example, the flange 8 of both shells 1, 2 is heated by means of infrared radiation and softened until they plasticize.

In a next step, for example, the flange 8 of the lower shell 2 is folded over around the flange 8 of the upper shell 1 with a suitable tool (see FIG. 4b), so that the fuel tank is given a peripheral edge-formed seam 9, which in particular also forms a sealing labyrinth because of the multiple folding of the individual layers.

This type of connecting technique makes allowance in particular for the fact that the layer thickness of the laminate 4 is at most 1.25 nm, essentially only the covering layers 5 of the laminate 4 contributing to the welding.

An alternative embodiment of the joining operation is represented in FIG. 5.

The upper shell 1 and the lower shell 2 have a flange of the same dimensions; the flanges 8 are placed flush one on top of the other for the purpose of connecting the shells.

Then, a U-shaped peripheral profile 10 of thermoplastic material, preferably of HDPE, is placed onto the tank seam, reaching around the flanges 8. The peripheral profile 10 is welded to the outer side of the organometallic sheets 3 while applying pressing pressure under heat.

Alternatively, adhesive bonding of the peripheral profile 10 may be provided, for example, with an adhesion promoter on the basis of LDPE.

The method according to the invention comprises the introduction of inserts 11 into the fuel tank before the joining of the upper shell 1 and the lower shell 2. For this purpose, the inserts, for example in the form of valves, nipples, filling-level sensors, surge tanks or the like, are premounted in a predetermined layout of the tank shell concerned on an insert carrier 12 in the form of a lattice support of thermoplastic material. The insert carrier 12 is then placed in the position shown in FIG. 2 in the upper shell 1 of the fuel tank.

The insert carrier 12 is formed, for example, as an injection-moulded plastic carrier, which is adapted to the contour of the upper shell 1 and has, for example, been placed into the upper shell 1. Alternatively, clamping or else welding is possible. The inserts 11, in the present case valves, are connected to one another by way of a relatively stiff venting line 13. One of the inserts 11 is provided with a connection nipple 14, which passes through a lead-through 15 of the upper shell 1.

The lead-through 15 is produced, for example, after completion of the upper shell 1 and before joining of the upper shell 1 to the lower shell 2, by cutting out a circle. Then, the insert carrier 12 is brought into the upper shell 1 in such a way that the connection nipple 14 passes through the lead-through 15. The connection nipple 14 lies, for example, with an encircling collar 16 against the laminate 4. The collar is provided with an annular groove 17, placed in which is an O-ring seal, which seals off the connection nipple 14 from the lead-through 15.

The connection nipple 14 is also provided with a thread 19, which passes through the lead-through 15. On the outer side of the upper shell 1, the nipple is secured by a nut 20, which engages in the thread 19.

Alternatively, the connection nipple 15 may be latched by a fastening element provided on the outer side of the upper shell 1.

LIST OF REFERENCE SIGNS

1 Upper shell
2 Lower shell
3 Organometallic sheet
4 Laminate
5 HDPE covering layer
6 Layer of adhesion promoter
7 EVOH layer
8 Flange
9 Sealing labyrinth
10 Peripheral profile
11 Inserts
12 Insert carrier
13 Venting line
14 Connection nipple
15 Lead-through
16 Collar
17 Annular groove
18 O-ring seal
19 Thread
20 Nut

What is claimed is:

1. A method for manufacturing a fuel tank, comprising:
    producing a laminate having a plurality of layers, at least one layer of the plurality of layers being a barrier layer for hydrocarbons,
    producing semifinished products in sheet form of fiber-reinforced material, each semifinished product of the semifinished products comprising woven or laid fibers embedded in a thermoplastic matrix, the fibers comprising at least one of glass fibers, carbon fibers and aramid fibers,
    after producing the laminate and the semifinished products, heat laminating the semifinished products with the laminate to provide laminated semifinished products,
    cooling the laminated semifinished products,
    after cooling the laminated semifinished products, heating the laminated semifinished products until the thermoplastic matrix plasticizes,
    thermoforming the plasticized laminated semifinished products to form shells, and
    joining the shells to form the fuel tank.

2. The method according to claim 1, wherein the laminated semifinished products are only laminated on one side and the laminated side forms an inner side of the fuel tank.

3. The method according to claim 1, wherein the shells are each formed with a peripherally encircling flange.

4. The method according to claim 1, wherein the step of joining the shells comprises a peripheral welding of the shells.

5. The method according to claim 4, wherein, during or after the welding, the flange of the shells is bent over to create an edge-formed seam.

6. The method according to claim 4, wherein the flange is provided with a peripheral profile, which reaches around the end faces of the shells.

7. The method according to claim 6, wherein the peripheral profile is adhesively bonded or welded to the shells.

8. The method according to claim 1, also comprising introducing inserts into the tank before the joining of the shells.

9. The method according to claim 8, wherein the inserts are premounted on an insert carrier and in that the insert carrier is inserted into at least one of the shells as a lost carrier.

10. The method according to claim 9, wherein the insert carrier is welded or clamped to at least one of the shells.

11. The method according to claim 1, wherein, before the joining, at least one shell is provided with at least one lead-through for at least one line connection, into which a connection element is inserted from the inside in a sealing manner.

12. The method according to claim 1, wherein the laminate has a maximum thickness of 1.25 mm.

13. The method according to claim 1, wherein the barrier layer has a thickness in a range of 50 to 250 micrometers.

14. The method according to claim 1, wherein a thickness ratio of the fiber-reinforced material to the laminate for at least one of the shells is in a range of 1.2 to 2.

15. The method according to claim 1, wherein the plurality of layers comprise at least five layers with EVOH as the barrier layer.

16. The method according to claim 15, wherein the barrier layer is sandwiched between two adhesion promoter layers, and the barrier layer and the two adhesion promoter layers are sandwiched between two covering layers.

17. The method according to claim 16, wherein each layer of the two adhesion promoter layers has a maximum thickness of 200 micrometers.

\* \* \* \* \*